US008229491B2

(12) United States Patent
Claussen et al.

(10) Patent No.: US 8,229,491 B2
(45) Date of Patent: Jul. 24, 2012

(54) PICOCELL BASE STATION AND METHOD OF ADJUSTING TRANSMISSION POWER OF PILOT SIGNALS THEREFROM

(75) Inventors: Holger Claussen, Swindon (GB); Lester Tse Wee Ho, Swindon (GB); Louis Gwyn Samuel, Dublin (IE)

(73) Assignee: Alcatel Lucent, Paris (FR)

( * ) Notice: Subject to any disclaimer, the term of this patent is extended or adjusted under 35 U.S.C. 154(b) by 583 days.

(21) Appl. No.: 12/330,845

(22) Filed: Dec. 9, 2008

(65) Prior Publication Data

US 2009/0156247 A1  Jun. 18, 2009

(30) Foreign Application Priority Data

Dec. 13, 2007 (EP) .................................... 07254851

(51) Int. Cl.
| | |
|---|---|
| H04B 7/00 | (2006.01) |
| H04B 7/185 | (2006.01) |
| H04W 68/00 | (2009.01) |
| H04W 4/00 | (2009.01) |
| H04W 36/00 | (2009.01) |
| H04M 11/00 | (2006.01) |

(52) U.S. Cl. .................. 455/522; 455/456.1; 455/422.1; 455/436; 455/439; 455/440; 370/318; 370/332

(58) Field of Classification Search .................. 455/522, 455/456.1, 422.1, 436, 439, 440; 370/318, 370/332

See application file for complete search history.

(56) References Cited

U.S. PATENT DOCUMENTS

| | | | |
|---|---|---|---|
| 5,940,761 A | 8/1999 | Tiedemann, Jr. et al. | |
| 6,195,551 B1 | 2/2001 | Kim et al. | |
| 6,347,220 B1 | 2/2002 | Tanaka et al. | |
| 7,505,780 B2 * | 3/2009 | Wei et al. | 455/522 |
| 2001/0055288 A1 | 12/2001 | Uebayashi et al. | |
| 2002/0058506 A1 | 5/2002 | Amin et al. | |
| 2002/0107021 A1 | 8/2002 | Ishikawa et al. | |
| 2003/0148774 A1 * | 8/2003 | Naghian et al. | 455/456 |
| 2004/0166863 A1 | 8/2004 | Kim et al. | |
| 2004/0242257 A1 | 12/2004 | Valkealahti et al. | |
| 2004/0246924 A1 * | 12/2004 | Lundby et al. | 370/332 |
| 2005/0009548 A1 | 1/2005 | Kelley et al. | |
| 2005/0136960 A1 | 6/2005 | Timus et al. | |
| 2005/0148368 A1 | 7/2005 | Scheinert et al. | |

(Continued)

FOREIGN PATENT DOCUMENTS

EP  0 856 955 A2  8/1998

(Continued)

OTHER PUBLICATIONS

European Search Report.

(Continued)

*Primary Examiner* — Bobbak Safaipour
(74) *Attorney, Agent, or Firm* — Fay Sharpe LLP

(57) ABSTRACT

A method is provided of adjusting transmission power of pilot signals from a picocell base station for radio communications to a user terminal in radio connection with the picocell base station. The method comprises: the base station sending a signal at a first signal power; the user terminal measuring received signal level and sending an information signal indicating received signal level; and the base station adjusting its pilot signal power dependent upon said received signal level indicated in the information signal.

10 Claims, 4 Drawing Sheets

U.S. PATENT DOCUMENTS

| | | |
|---|---|---|
| 2005/0250527 A1 | 11/2005 | Jugl et al. |
| 2006/0068827 A1* | 3/2006 | Eckl .......................... 455/522 |
| 2006/0068828 A1* | 3/2006 | Eckl .......................... 455/522 |
| 2006/0068849 A1 | 3/2006 | Bernhard et al. |
| 2006/0069526 A1 | 3/2006 | Kaiser et al. |
| 2006/0121930 A1 | 6/2006 | Miyoshi et al. |
| 2006/0145051 A1 | 7/2006 | Kawai et al. |
| 2006/0154670 A1 | 7/2006 | Miyabayashi et al. |
| 2006/0209808 A1* | 9/2006 | Lundby et al. ............... 370/355 |
| 2007/0249347 A1 | 10/2007 | Saifullah et al. |
| 2007/0253372 A1 | 11/2007 | Nakayasu |
| 2007/0268869 A1* | 11/2007 | Lundby et al. ............... 370/332 |
| 2008/0057933 A1 | 3/2008 | Brunner |
| 2008/0090512 A1* | 4/2008 | Little et al. ..................... 455/1 |
| 2008/0132222 A1* | 6/2008 | Brady ........................ 455/422.1 |
| 2008/0182584 A1 | 7/2008 | Le |
| 2008/0188265 A1 | 8/2008 | Carter et al. |
| 2009/0104879 A1* | 4/2009 | Moulsley et al. ............... 455/68 |
| 2009/0156247 A1* | 6/2009 | Claussen et al. .............. 455/522 |
| 2009/0163224 A1* | 6/2009 | Dean et al. ................. 455/456.1 |
| 2009/0298470 A1* | 12/2009 | Huber et al. ................... 455/411 |
| 2009/0318181 A1* | 12/2009 | Tao et al. ..................... 455/522 |
| 2010/0056184 A1* | 3/2010 | Vakil et al. ................. 455/456.5 |

FOREIGN PATENT DOCUMENTS

| | | |
|---|---|---|
| WO | WO 02/27966 A2 | 4/2002 |
| WO | WO 2006/010958 A2 | 2/2006 |

OTHER PUBLICATIONS

Snyder, T. et al. "Indoor wireless networks: issues and answers", Apr. 2002, www.rfdesign.com; pp. 42-48.

* cited by examiner

PICOCELL BASE STATION AND METHOD OF ADJUSTING TRANSMISSION POWER OF PILOT SIGNALS THEREFROM

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as microcells, picocells, or femtocells, but we use the term picocells generically for cells that are smaller than macrocells. One way to establish a picocell is to provide a picocell base station that operates within a relatively limited range within the coverage area of a macrocell. One example of use of a picocell base station is to provide wireless communication coverage within a building.

Picocells can be deployed without detailed centralized cell-planning, for example by end-users or unskilled individuals installing picocell base stations in their offices and homes. In consequence, picocell base stations can often be placed at locations that are inappropriate. Locations are inappropriate if signals from such picocell base stations, in particular pilot signals, are detected by user terminals that are outside the building and are connected to the macrocell base station. An example of an inappropriate location is near a window and facing a busy road. A picocell base station in such a location causes interference to the macrocell base station. Also, undesirable handover attempts can be triggered, of that outside user terminal from connection with the macrocell base station to connection with the picocell base station.

Picocell base stations are intended primarily for users belonging to a particular home or office. Handovers of radio connections of outside user terminals to the picocell base station are not desirable for several reasons. Firstly, handovers involve substantial resources in terms of signalling traffic. Secondly, in consequence, the processes of handover to or from the picocell base station reduces the amount of data traffic that can be handled by the picocell base station at that time. This results in a reduction in quality of service to a home user. Thirdly, as the number of picocell base stations increases within a network, more network resources are required to handle handovers to or from picocell base stations. This gives rise to a practical limit on the number of picocell base stations that can be deployed within a macrocell area.

The picocell base station is of a relatively low transmission power and hence each picocell is small compared to a macrocell. There can be a large number of picocells within an area roughly equivalent to the size of a macrocell. Accordingly, a macrocell user moving along a road may often move in and out of range of picocell base stations, causing a sequence of handover attempts to and from picocells. As mentioned above, this is to the detriment of data handling performance of the picocells.

In cellular telecommunications systems generally, the transmit power for pilot signals is typically set as a predetermined fraction of the base stations maximum transmission power, for example 10%. This is to ensure pilot signals are of sufficient strength to be received by a user terminal in idle mode anywhere in the cell of a base station. Coverage and capacity of the base station is thereby maximised. However, as regards picocells, this approach is undesirable as it might cause significant "leakage" of pilot signals from inside a building in which a picocell base station is located, to outside the building, for example, via windows. In other words, a macrocell user outside the building may receive, and so be in range of, the pilot signals from a picocell base station. This has the problems discussed above of excessive handover attempts and consequential detriment to data handling performance.

A known technique to reduce these problems is to adjust the pilot signal transmission power to the minimum that will suit a building interior, for example upon installation of the picocell base station. Another known technique is to carefully select the best placement of the picocell base station within the building, for example away from windows that are near busy roads. However, even using these techniques, a pilot signal transmission power that provides reasonable coverage in the building can still result in significant "leakage" due to the presence of windows.

In picocells where there is a terminal in active mode connection, i.e. in a call, a known approach is to maintaining pilot power from the picocell base station to a user terminal in active mode at a constant maximum level. This is to ensure that the appropriate pilot signals can be received by user terminal in active mode anywhere in the picocell.

SUMMARY OF THE INVENTION

The reader is referred to the appended independent claims. Some preferred features are laid out in the dependent claims.

A method is provided of adjusting transmission power of pilot signals from a picocell base station for radio communications to a user terminal in radio connection with the picocell base station. The method comprises: the base station sending a signal at a first signal power; the user terminal measuring received signal level and sending an information signal indicating the received signal level; and the base station adjusting its pilot signal power dependent upon said received signal level indicated in said information signal.

In preferred embodiments, the pilot power is adjusted using measurements from the user terminal in active mode. In preferred embodiments, the pilot powers are set to be large enough to ensure adequate coverage in the building, such as a home, for which the picocell base station is intended. However the pilot powers are adjusted to a minimum level to achieve this. This avoids excessive extension of the picocell outside the building, as that would result in many unnecessary handover requests from "outsider" user terminals that are not authorised to use the picocell.

In preferred embodiments the picocell base station can adjust its pilot power to a level required by the user terminal in active mode. This contrasts with the known approach of maintaining the pilot power in active mode at a constant maximum level which would only actually be needed in a worst case scenario. In consequence, in preferred embodiments, a user terminal connected to a macrocell, but not being authorised to use the picocell, is less likely to enter a resource-consuming, but eventually fruitless, process of seeking to handover to the picocell base station by sending a handover request.

BRIEF DESCRIPTION OF THE DRAWINGS

An embodiment of the present invention will now be described by way of example and with reference to the drawings, in which.

DETAILED DESCRIPTION

Figure 1:
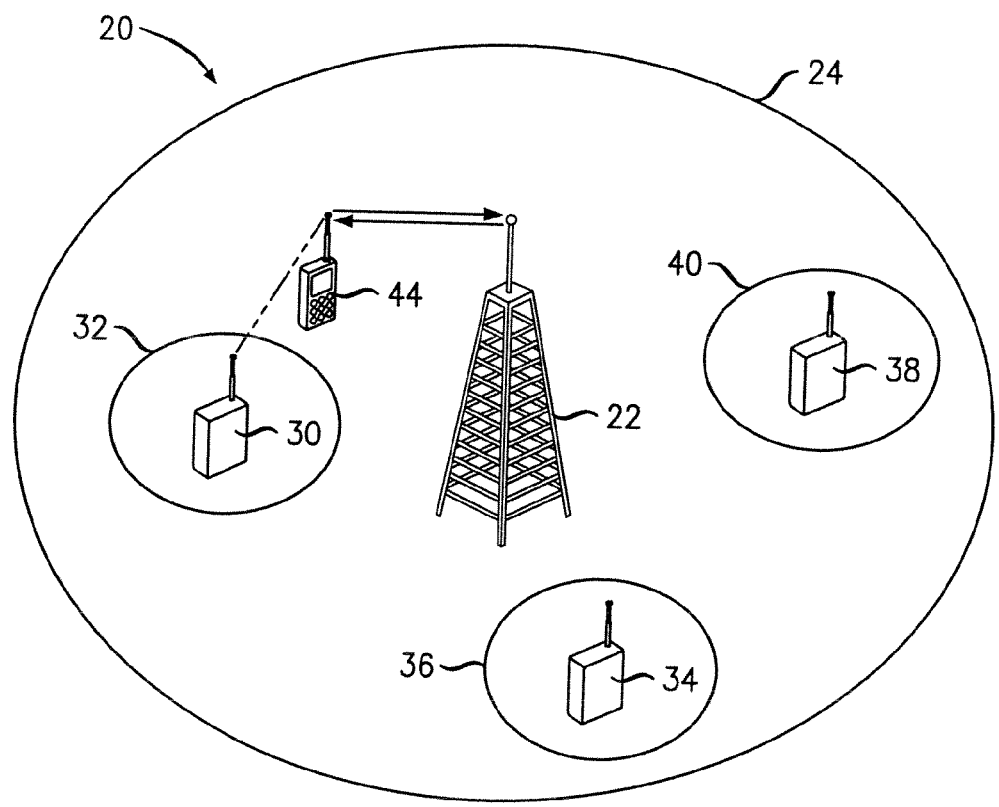
FIG. 1 is a diagram illustrating a wireless communications network according to a first embodiment of the invention.

As shown in FIG. 1, in a communication system 20, there is a base station 22 for wireless telecommunications. The base station has a radio coverage area 24 that is often referred to as a macrocell. The geographic extent of the macrocell 24 depends on the capabilities of the base station 22 and the surrounding geography.

Within the macrocell 24, a picocell base station unit (PCBSU) 30 provides wireless communications within a picocell 32. The radio coverage area of the picocell 30 is much less than that of the macrocell 24. For example, the picocell 32 corresponds in size to a user's home.

Another PCBSU 34 provides wireless coverage within a picocell 36. A further picocell 38 provides wireless coverage within a picocell 40.

It is possible for a mobile terminal 44 within the macrocell 24 to communicate with the macrocell base station 22 in known manner. When the mobile terminal 44 enters into a picocell 32 for which the mobile terminal is authorised for communications within the picocell base station 30, it is desirable to handover the connection with the mobile terminal from the macrocell to the picocell. In the example shown in FIG. 1, the user of mobile terminal 44 is a preferred user to use picocell 32.

Figure 2:
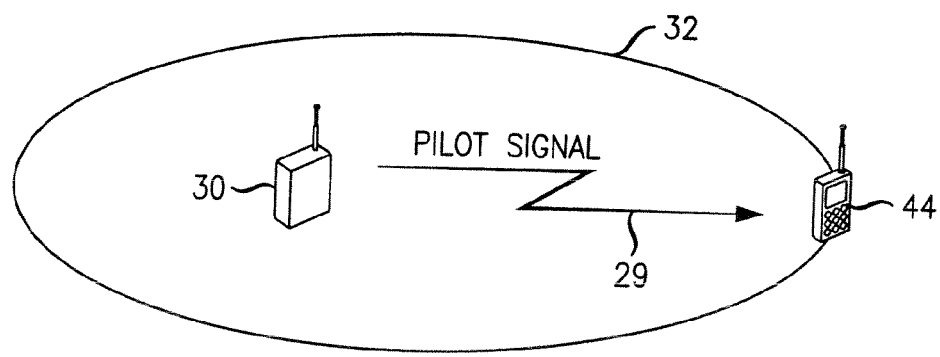
FIG. 2 is a diagram illustrating the picocell associated with the picocell base station unit shown in FIG. 1.

As shown in FIG. 2, the picocell base station unit 30 transmits pilot signals 29 in the picocell 32 which is an area of radio coverage.

Figure 3:
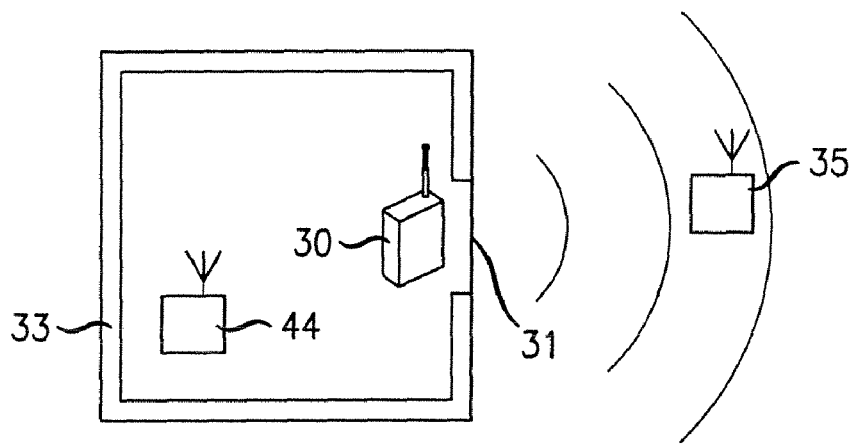
FIG. 3 is a diagram illustrating the picocell base station unit shown in FIG. 1 located in a building.

As shown in FIG. 3, imagine that the picocell base station unit 30 is located within a building 33 having a window 31. The picocell 32 may extend somewhat beyond the building 33 through the window 31. So as to reduce such "leakage" of pilot signals outside the building, pilot signal power control is undertaken as explained below.

Pilot Power Control

The user terminal is set to camp on the PCBSU, in other words be subject to idle mode connection to the PCBSU, upon receiving a low power pilot signal from that PCBSU. However in active mode, such low pilot powers do not enable necessary information, such as channel estimates, to be received by the user terminal with acceptable accuracy. Accordingly a higher pilot signal power is required to a user terminal in active mode and it is that power which must be strictly controlled.

This power control is of power of pilot signals that are used in an active call, in other words to a user terminal that is in active mode of connection, i.e. call-connected, that is in a service session. The power control is described in more detail below. In active mode, feedback is available from the user terminal regarding pilot signal reception.

Picocell Base Station Unit

Figure 4:
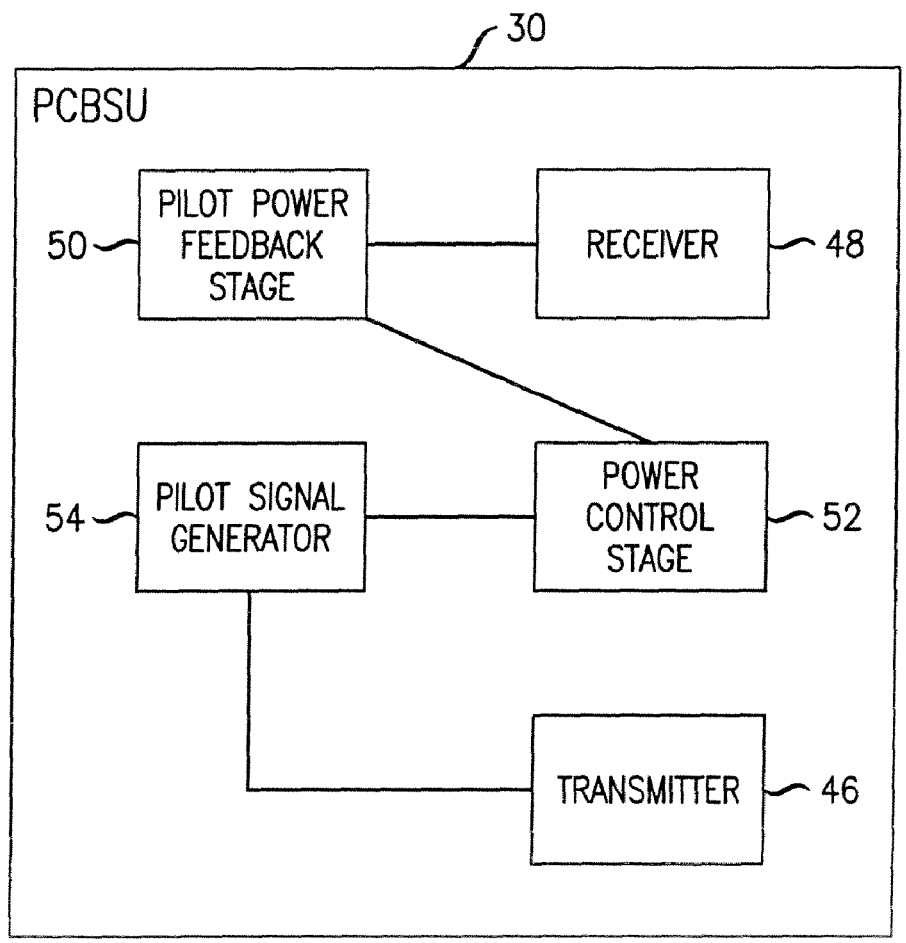
FIG. 4 is a diagram illustrating the picocell base station unit shown in FIGS. 1 to 3.

As shown in FIG. 4, the picocell base station unit (PCBSU) 30 includes a radio transmitter 46 and a radio receiver 48. The receiver 48 is connected to a pilot power feedback detection stage 50. The pilot power feedback detection stage 50 is connected to a power control stage 52. The power control stage 52 is connected to a pilot signal generator stage 54. The pilot signal generator stage 54 is connected to the transmitter 46.

Pilot Power Control

Referring to FIGS. 2 and 4, in use, pilot signals 29 are transmitted by the transmitter 46. The pilot power to be used is determined from measurements by the user terminal. The user terminal 44 measures the pilot signal power at the user terminal and sends back a signal (not shown) including information of that measured value. This is a feedback signal. This feedback signal is received by the receiver 48 and the information of pilot signal power at the user terminal is determined in the pilot power feedback detection stage 50. This pilot power feedback detection stage 50 provides a control signal dependent on the determined pilot signal power operative to adjust the output power of the pilot signal generator 54. The pilot signals produced by the pilot signal generator 54 are provided to the transmitter 46 from where they are then transmitted.

Pmax

The pilot signal transmission power from the base station always needs to be kept below an upper limit Pmax. The purpose of imposing Pmax is so that in active mode (active call connection) the pilot signal from the PicoCell Base Station Unit (PCBSU), does not radiate excessively outside the building. The value of Pmax is a preset default value, in this example it is the maximum power that the PCBSU can transmit.

Pmin

When there is more than one authorised user, the pilot power needs to be kept above a specific lower limit Pmin. Pmin is the minimum pilot signal power required to ensure that user terminal entering the picocell can detect and camp (in idle mode) on the picocell base station unit (PCBSU). In other words, Pmin is the minimum Pilot power level that enables user terminals anywhere in the picocell to connect to the PCBSU.

The pilot power level required for this idle-mode camping is less than required in active mode. In this example, the value of Pmin is a preset default value.

Operation

Figure 5:
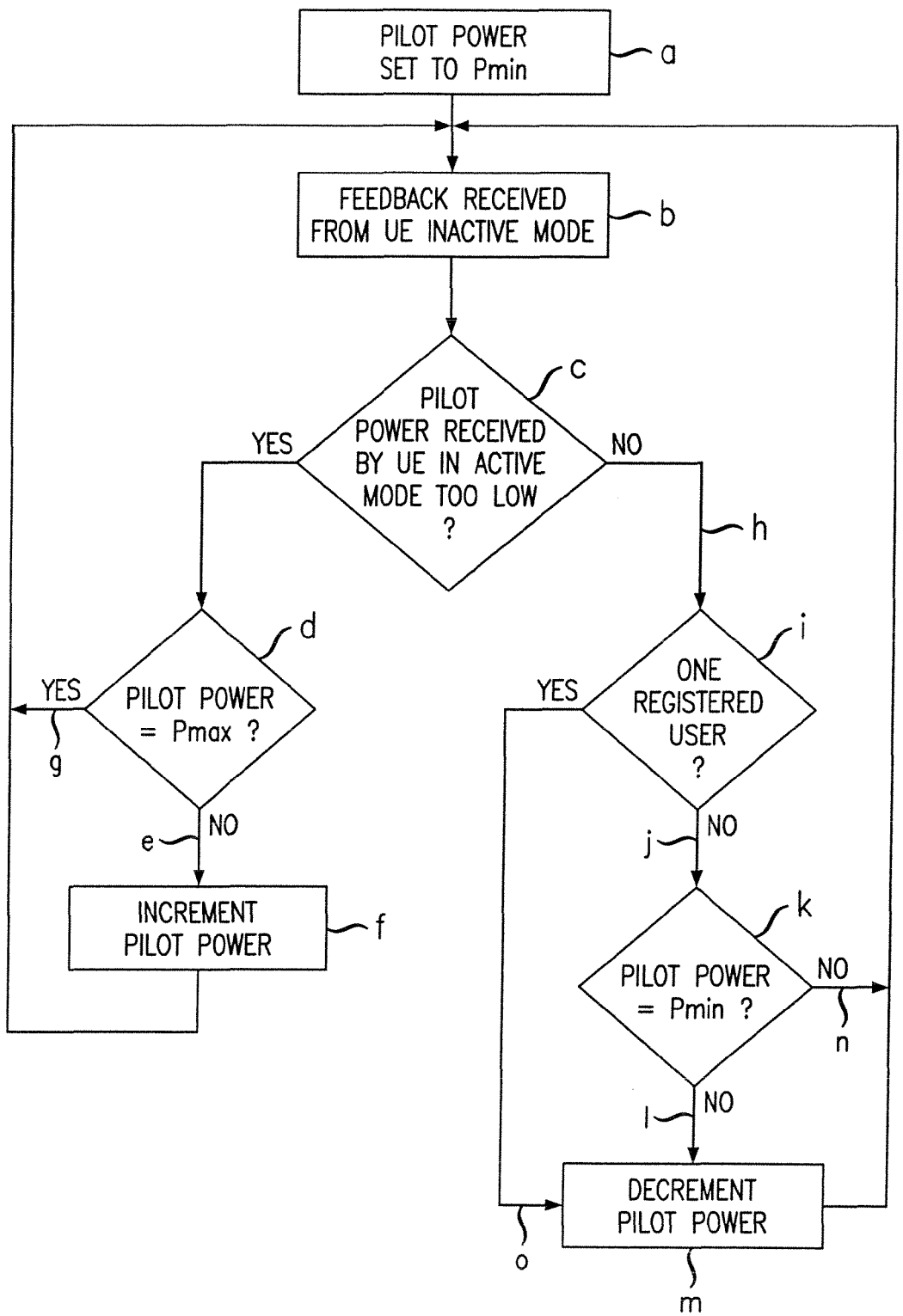
FIG. 5 is a flow chart illustration operation of the picocell station station unit shown in FIGS. 1 to 4.

As shown in FIG. 5, power control of pilot signals at the PCBSU is as follows:

The pilot signal power is set (step a) initially to Pmin in the pilot signal generator 54. Feedback as to the level of reception of the pilot signal by the user terminal is received (step b) at the receiver 48 of the PCBSU 30 and decoded at the pilot power feedback stage 50. This feedback is from a user terminal in active mode. A check is made (step c) in the pilot power feedback stage 50 as to whether the pilot power reception at the user terminal was unacceptably low.

If Yes, a check is made (step d), in the power control stage 52, as to whether the pilot power is at Pmax. If No, i.e. the power is less than Pmax (step e), then an incremental increase in pilot signal power is made (step f), but if Yes, a return is made (step g) to step b.

If the check made at step c indicates that the pilot power received by the user terminal in active mode is not too low (step h), then a query is made (step i) as to whether or not there is just one registered, i.e. authorised, user for that PCBSU.

If No (step j), i.e. there is more than one registered user, then a check is made (step k) whether the pilot power is at Pmin. If No (step l), i.e. the pilot power is not at Pmin then the pilot power level is decreased (step m) by a predetermined decrement, after which a return is made to step b. If Yes (step n), i.e. the pilot power is at Pmin, then a return is made to step b.

At step i, if it is determined that there is only one registered user (step o), then the pilot power is decreased (step m) regardless of whether the pilot power has reached Pmin.

Some particular example pilot power control scenarios will now be described.

(A) Multiple User Terminals Authorised One User Terminal in Active Mode

Figure 6:
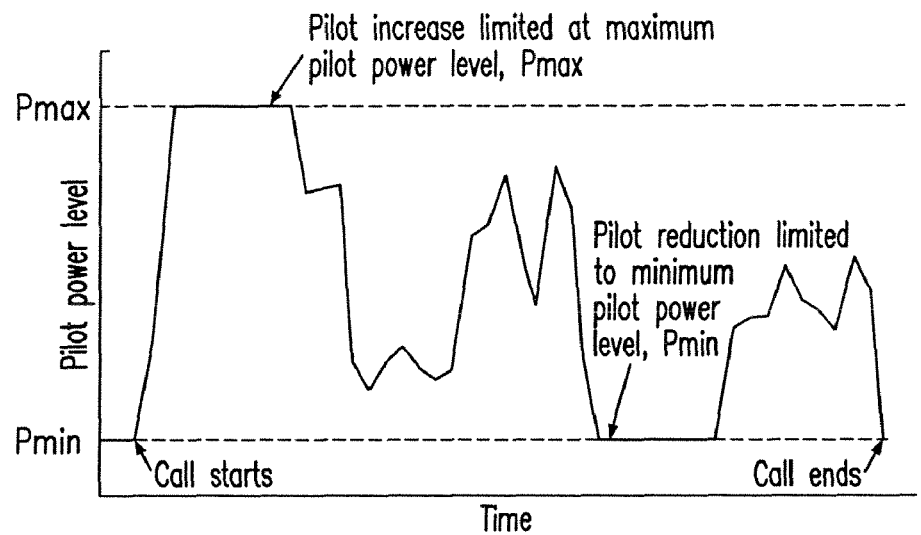
FIG. 6 is an example graph of pilot signal transmission power over time when there is one authorised active-mode user terminal in the picocell but others are authorised.

As shown in FIG. 6, in this scenario both Pmax and Pmin apply. FIG. 6 is an example graph of power level of pilot signals transmitted from the picocell base station unit (PCBSU) before, during, and after, an active call connection with one user terminal within the picocell. As shown in FIG. 6, when there are no active calls, the pilot power is at Pmin. Upon the call starting, the pilot power level is adjusted using power control feedback to a minimum power that suits the call connected user terminal at that time. This pilot power varies dependent on user terminal location or movement, so as to provide acceptable pilot signal reception at the user terminal despite varying fading, attenuation, multipath signal losses etc.

The pilot power is not allowed to exceed Pmax, for example when the user terminal moves into the garden or street or into the basement, even though the power control is such that the user terminal requests more power. The pilot power is not allowed to go below Pmin, for example even though when the user terminal is right next to the PCBSU, a lower pilot power would be acceptably received by the user terminal. This is because, as mentioned above, another authorised user terminal entering the picocell would need to receive the pilot signals.

Once the call connection ends, the pilot power returns to Pmin.

(B) One User Terminal Authorised

In this scenario Pmin does not apply. As there is only one user terminal authorised to use the PCBSU, provided the pilot signal is sufficiently large to be received by that user terminal, there is no need to keep that pilot signal above Pmin as there are no further authorised user terminals to consider.

As only one user terminal is authorised, when that user terminal makes a call connection to the picocell base station unit (PCBSU) and so is in active mode, then provided reception by that user terminal of pilot signals is acceptable, the pilot power can drop below Pmin. This is because there is no need to ensure coverage for other users. In this case the effect of radio "leakage" outside of the building is actually reduced to a level lower than that when the user terminal is in idle mode. An example of where reduction of pilot power below Pmin occurs is when the sole authorised user terminal is adjacent the PCBSU. This power reduction, with consequential reduction in risk of interference, is particularly beneficial when the user terminal is in active mode for a long period of time, for example in streaming radio, mobile television, corporate Virtual Private Networks (VPNs), web surfing.

(C) Multiple User Terminals Authorised, Multiple User Terminals in Active Mode

Figure 7:
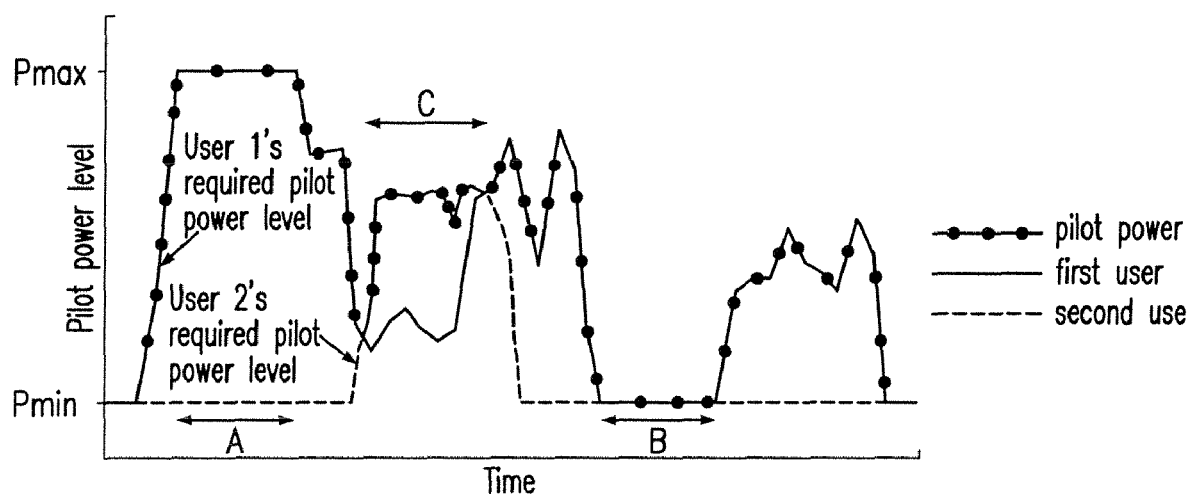
FIG. 7 is an example graph of pilot signal transmission power over time when there two authorised active-mode user terminals in the picocell.

As shown in FIG. 7, when there are, for example, two authorised and active user terminals in the PCBSU, the pilot power is adjusted to suit the user terminal with the higher pilot power requirement, but without leaving the range define by Pmax and Pmin. The pilot power is adjusted so as to meet the currently higher, i.e. more demanding, of the pilot power requirements of the two user terminals.

As shown in FIG. 7, in this example the pilot power is adjusted to meet the requirement of a first user terminal except during the time period denoted C, when the requirement of the second user terminal exceeds that of the first user terminal. In period A, the pilot power is Pmax. In period B, the pilot power is Pmin.

Some Variants

In an alternative embodiment, pilot power is adjusted based on estimates, made at the user terminal, of pilot channel received quality, rather than measurements of received pilot signal power at the user terminal.

In an alternative embodiment, the user terminal measures received power level of signals other than pilot signals, such as signals used in downlink power control, for example a RACH channel signal or paging channel signal. This means that current "legacy" user terminals can make, and report, the measurements of received power level.

In some alternative embodiments, the value of Pmax and/or Pmin can be set and periodically updated by auto-configuration cell-sizing technique(s).

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of adjusting transmission power of pilot signals from a picocell base station for radio communications to a user terminal in radio connection with the picocell base station, the method comprising:
   the base station sending a signal at a first signal power;
   the user terminal measuring received signal level and sending to the base station an information signal indicating the received signal level; and
   the base station adjusting its pilot signal power dependent upon said received signal level indicated in said information signal without regard to a minimum pilot signal power limit and without regard to an information signal indicating a received signal level from any other user terminal, thereby adjusting the pilot signal to a minimum power level required to maintain a desired communication quality with the user terminal, without regard to maintaining a minimum coverage area and without regard to maintaining communication with any other user terminal.

2. A method according to claim 1, in which the user terminal is in active mode such that the radio connection is a call connection.

3. A method according to claim 1, in which said base station sending said signal at said first signal power comprises sending a pilot signal at a first pilot power level; and said received signal level is the received pilot signal level.

4. A method according to claim 1, in which steps are repeated of: the user terminal measuring received signal level and sending an information signal indicating received signal level, and the base station adjusting its pilot signal power dependent upon received signal level indicated.

5. A method according to claim 1, in which the other user terminals are authorised user terminals in respect of the picocell base station.

6. A method according to claim 1, in which there are no other user terminals that are authorised in respect of the picocell base station, and the pilot power is adjustable down to any level still enabling acceptable pilot packet reception by the user terminal.

7. A method according to claim 1, in which the power is controlled to not exceed a predetermined maximum pilot power level, the maximum pilot power level being that which provides an acceptable level of interference to other cells or picocells.

8. A picocell base station,
the base station comprising:
  a transmitter operative to send a signal at a first power;
  a receiver operative to receive an indication of received signal level as measured at a user terminal;
  a processor operative to decode the indication of the received signal level;
  a pilot power control stage operative to adjust, dependent upon the indication of the received signal level, the power of a pilot signal to be transmitted without regard to a minimum pilot signal power limit and without regard to an information signal indicating a received signal level from any other user terminal, thereby adjusting the pilot signal to a minimum power level required to maintain a desired communication quality with the user terminal, without regard to maintaining a minimum coverage area and without regard to maintaining communication with any other user terminal; and
  the transmitter being operative to transmit the pilot signal.

9. A picocell base station according to claim 8, in which said pilot signal is a further pilot signal and said signal at a first power is a pilot signal.

10. A picocell base station according to claim 8, in which the power control stage is operative to not exceed a predetermined maximum pilot power level, the maximum pilot power level having been selected as that which provides an acceptable level of interference to other cells or picocells.

* * * * *